United States Patent [19]

Moriguchi et al.

[11] Patent Number: 5,272,314
[45] Date of Patent: Dec. 21, 1993

[54] CONSUMABLE ELECTRODE TYPE D.C. ARC WELDER

[75] Inventors: Haruo Moriguchi, Itami; Tetsurou Ikeda, Osaka; Kenzo Danjo, Kizu; Masahiro Aoyama, Higashi; Karino Kunio, Suita, all of Japan

[73] Assignee: Sansha Electric Manufacturing Co., Ltd., Osaka, Japan

[21] Appl. No.: 991,436

[22] Filed: Dec. 16, 1992

[30] Foreign Application Priority Data

Dec. 16, 1991 [JP] Japan .................. 3-353356

[51] Int. Cl.⁵ .................................................. B23K 9/10
[52] U.S. Cl. ........................... 219/130.33; 219/130.21
[58] Field of Search .................... 219/130.21, 130.31, 219/130.32, 130.33, 137 PS

[56] References Cited

U.S. PATENT DOCUMENTS

| | | | |
|---|---|---|---|
| 3,792,225 | 2/1974 | Needham et al. | 219/130.21 |
| 4,476,376 | 10/1984 | Mizuno et al. | 219/130.21 |
| 4,521,672 | 6/1985 | Fronius | 219/130.33 |
| 4,665,299 | 5/1987 | Iwata | 219/130.21 |

FOREIGN PATENT DOCUMENTS 61-216859 9/1986 Japan .

Primary Examiner—Clifford C. Shaw
Attorney, Agent, or Firm—Wegner, Cantor, Mueller & Player

[57] ABSTRACT

A consumable electrode type d.c. arc welder including an invertor, which is arranged to rectify an a.c. power from a power supply, once convert a resultant d.c. power into a high frequency a.c. power by the invertor and again rectify it to obtain a d.c. power for welding, and provided with means for detecting a current flowing through its welding load to certainly discriminate shortening and arcing states between a welded base material and a welding electrode rod and controlling the invertor with a resultant discrimination signal to reduce its output voltage during the shortening period, thereby preventing spattering produced by an over-current.

2 Claims, 3 Drawing Sheets

Va

Ia $\Delta i$

Gi

Gv

Gi+Gv

CONSUMABLE ELECTRODE TYPE D.C. ARC WELDER

BACKGROUND OF THE INVENTION

This invention relates to a consumable electrode type d.c. arc we and, especially, to an improved invertor type d.c. arc welder with a consumable welding electrode, which is provided with novel means for preventing occurrence of undesirable spattering.

The inverter type d.c. arc welder, which has been developed for making a welding power source device small in size and weight, is arranged to effect voltage transformation with a lightweighted inverter compsoed of semi-conductor switching elements without use of a heavy input transformer. More specifically, as disclosed in the Japanese patent opening gazette No. S61-216859 for example, in a welder of this kind, its welding d.c. power is produced by once rectifying and smoothing an input a.c. power, then converting it into a high frequency a.c. power by the inverter, reducing its voltage to a suitable level by a small-sized and lightweighted output transformer and again rectifying it to produce a d.c. power for welding. In the cited device, its average output voltage is stabilized by detecting variation of the output voltage and controlling a conduction time of the switching elements of the inverter with a resultant detection signal.

While consumable electrode type d.c. arc welding such as $CO_2$ welding, MAG welding and MIG welding is effected by supplying the above-mentioned stabilized d.c. power from the welder to a welding load formed with a continuously fed welding electrode rod and a base material to be welded, separating the electrode rod shorted to the base material therefrom to form an arc and, thereafter, similarly repeating shorting and arcing, undesirable spattering may occur if the d.c. power supplied to the welding load becomes excessive at the time of shorting. It has been a general practice for suppressing this spattering to provide a large d.c. reactor in the output side of the welder for preventing sudden increase of the welding current, but it has been a bar to small-sizing and lightweighting of the device.

In order to prevent spattering without a larger reactor, it is considered to detect a shorting period from variation of the output voltage and control the inverter as above-mentioned on the basis thereof to reduce the output voltage during this period. The output voltage of the welder varies originally as shown in FIG. 1(a) and, therefore, it should be easy to distinguish therefrom a shorting period Ts and an arcing period Ta. In practice, however, noises are superimposed thereon to make their transitional points unclear. In other words, the voltage across the output terminals of the welder includes high frequency ripples as shown in FIG. 1(b) since the output terminals and the welding load are mutually connected through long cables of 10 to 20 meters long, for example. Therefore, erroneous detection is liable to occur and complete prevention of spattering is difficult. Although it is possible to reduce influence of the high frequency ripples by using the voltage across the welding load instead of the voltage between the output terminals, it is necessary to change connection of a voltage detector every time the electrode or base material is changed and this operation is not only troublesome but also dangerous since conductors of the detector may break to cause electrical leakage.

Accordingly, an object of this invention is to provide an improved inverter type d.c. arc welder with a consumable electrode, including novel means for effectively preventing spattering without any troublesome operation as above.

SUMMARY OF THE INVENTION

This invention is based upon output current detection in view of the above mentioned shortcom of output voltage detection. More particularly, the inverter type d.c. arc welder with a consumable electrode /according to this invention is provided with feedback control means for detecting a difference between the output voltage and a predetermined reference voltage and controlling the invertor in accordance with this difference to constantly maintain average output voltage and arranged to excessively reduce the average output voltage only during the shorting period of the welding load by detecting the d.c. output current of the welder to produce a detection signal and differentiating the detection signal to reduce the above-mentioned reference voltage by a predetermined value during a positive level of the resultant signal.

These and other features and operation of this invention will be described in more detail below with reference to the accompanying drawings in connection with an embodiment thereof.

DESCRIPTION OF PREFERRED EMBODIMENT

Figure 2:
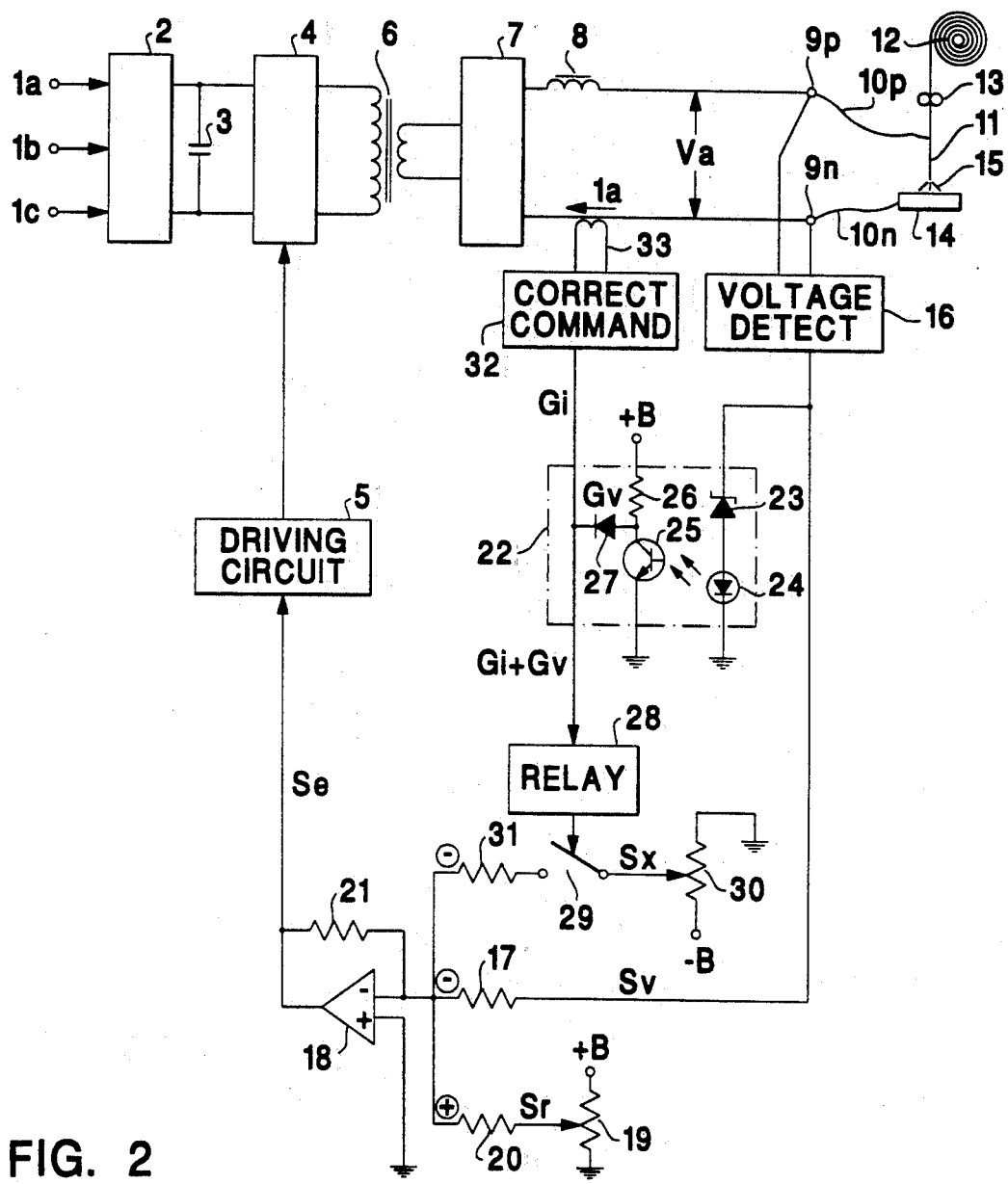
FIG. 2 is a schematic circuit diagram showing an embodiment of a consumable electrode type d.c. arc welder including spattering preventing means according to this invention.

Referring to FIG. 2, an a.c. power supplied from a commercial power supply of three-phase and 200 volt a.c., for example, through input terminals 1a, 1b and 1c of the welder is rectified by an input 3-phase rectifier 2 of diode bridge type, for example, smoothed by a smoothing capacitor 3 and supplied to an inverter 4. The inverter 4 is composed of semiconductor switching elements, such as bipolar transistors and field effect transistors, and produces a high frequency a.c. power through its high frequency switching operation under control of an inverter driving circuit 5. The high frequency power is suitably reduced in voltage by an output transformer 6, rectified by an output rectifier 7 of diode bridge configuration, for example, and then delivered through a smoothing and current limiting d.c. reactor 8 from positive and negative output terminals 9p and 9n. The positive output terminal 9p is connected through an insulated cable 10p to an electrode rod 11 continuously supplied from a hoop 12 through a feeding mechanism 13 and the negative output terminal 9n is connected through a cable 10n to a base material 14 to be welded. The electrode rod 11 and base material 14 form a welding load 15 which produces an arc therebetween.

An output voltage Va between the output terminals 9p and 9n is detected by a voltage detector 16 and supplied as a negative output voltage signal Sv through a resistor 17 to a negative input terminal of an operation amplifier 18 whose positive input terminal is grounded To the negative input terminal of the operation amplifier 18, a positive reference voltage signal Sr of a predetermined level is also applied through a resistor 20 from a reference voltage setting potentiometer 19. Accordingly, the operation amplifier 18 amplifies (Sr-Sv), the sum of both inputs, to produce an error signal Se which is supplied to the inverter driving circuit 5 as its control signal. The driving circuit 5 responds to the error signal Se and controls a conduction time of the switching elements so that the error signal Se becomes zero, thereby stabilizing the output voltage. 21 denotes a feedback resistor of the operation amplifier 18.

In the drawing, a phantom block 22 denotes a correction commanding circuit for spattering prevention, including a Zener diode 23, a light emitting diode 24, a phototransistor 25, a resistor 26 and a diode 27, and the light emitting diode 24 and phototransistor 25 form a photocoupler. As shown, the output of the voltage detector 16 is grounded through the Zener diode 23 and light emitting diode 24 and a +B source is grounded through the resistor 26 and phototransistor 25. A junction of the resistor 26 and phototransistor 25 is connected through a diode 27 to a relay 28 provided with a normally-open switch 29. The switch 29 connects a negative voltage of a correction voltage setting potentiometer 30 through a resistor 31 to the negative input terminal of the operation amplifier 18.

Figure 1A:
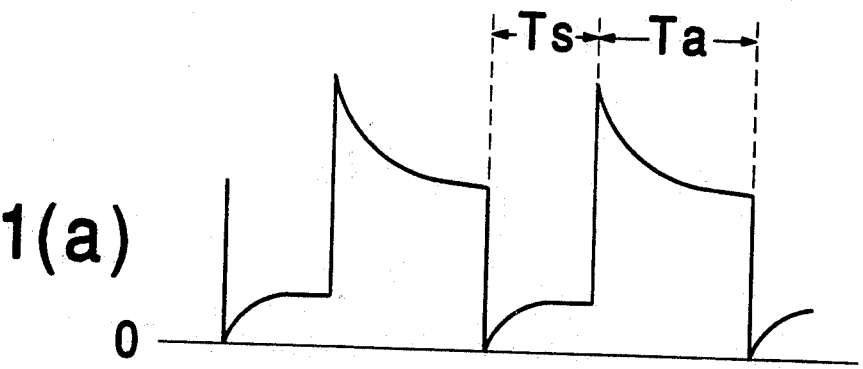
FIGS. 1(a) and (b) are waveform diagrams showing variation of the output terminal voltage of a d.c. arc welder.
Figure 1B:
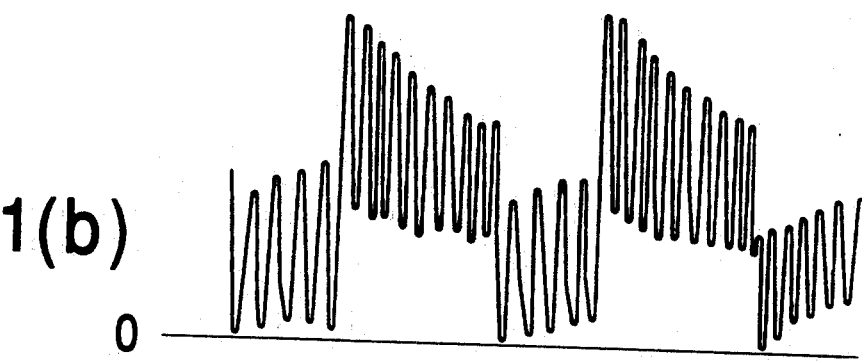
Figure 3:
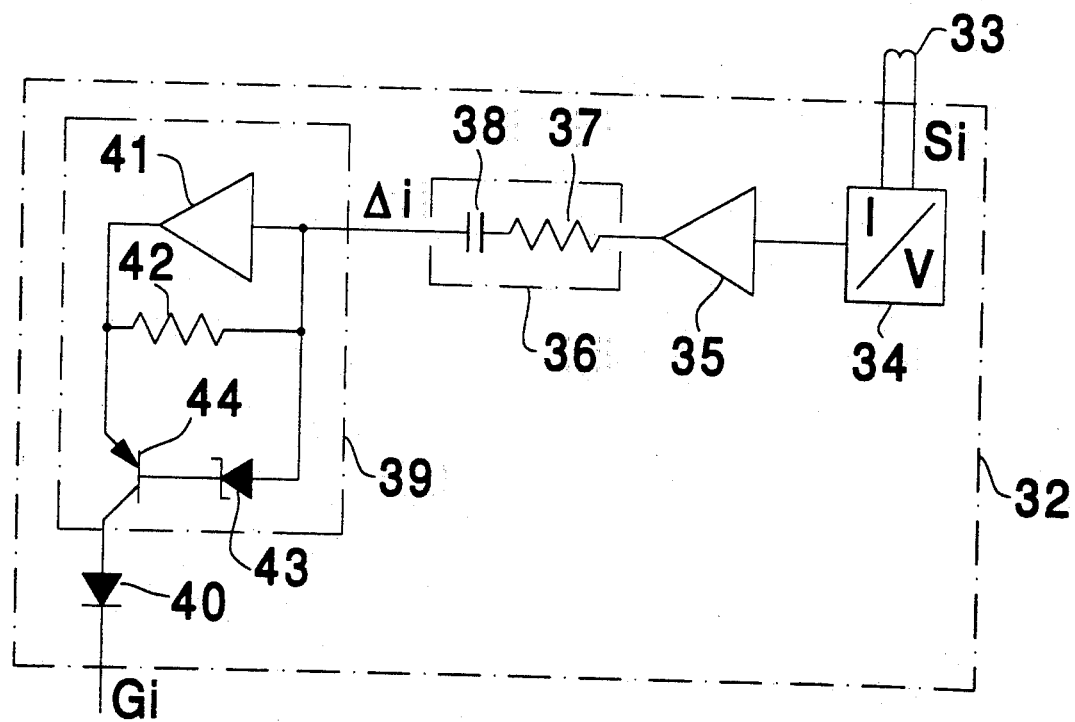
FIG. 3 is a schematic circuit diagram showing an embodiment of an essential portion of the spattering preventing means according to this invention.

The relay 28 is driven also by a second correction commanding circuit 32 provided with a current detector 33 for detecting a welding current Ia. As shown in FIG. 3, the circuit 32 includes a current-to-voltage convertor 34 for converting the current detected by the current detector 33 into a voltage, an amplifier 35 for amplifying the output voltage of the convertor 34, a differentiation circuit 36 composed of a resistor 37 and a capacitor 38 for differentiating the output voltage of the amplifier 35, and a gating voltage generator 39 responsive to the differentiated output from the circuit 36 for supplying a command signal through a diode 40 to the relay 28. The gating signal generator 39 includes an operation amplifier 41, a resistor 42, a Zener diode 43 and a transistor 44 which are connected as shown. The diodes 27 and 40 constitute an OR gate.

Next, the description will be made on the operation of the first and second correction commanding circuits 22 and 32. In the arcing period in which the voltage between the output terminals 9p and 9n of the welder, which is detected by the voltage detector 16, exceeds a predetermined level, the Zener diode 23 conducts to energize the light emitting diode 24 and, as a result, the phototransistor 25 conducts and its collector voltage becomes zero. Therefore the signal Gv becomes "0" and the relay 28 is not actuated. In the shorting period in which the output voltage is below the predetermined level, however, the Zener diode 23 is nonconductive and, therefore, the phototransistor 25 is also nonconductive. Accordingly, the collector voltage of the phototransistor 25, that is, the gating signal Gv becomes a high level "1" and actuates the relay 29 to close the switch 28. Thus, a negative voltage preset by the potentiometer 30 is applied as a correction signal Sx to the operation amplifier 18. Accordingly, the input signal of the operation amplifier 18 becomes (Sr-Sv-Sx) in total and its output error signal Se drops from the aforementioned normal value by a value corresponding to the value of Sx. Consequently, the output voltage of the inverter 8 and, accordingly, the output voltage Va drops and the capacity of the d.c. reactor 8 increases equivalently to suppress production of spattering. The above-mentioned gating signal Gv is shown in FIG. 4(e).

On the other hand, a detection signal Si produced by the current detector 33, which is proportional to the welding current Ia, is converted into a voltage signal by the convertor 34, amplified by the amplifier 35 and applied to the differentiation circuit 36. While the output terminal voltage Va of the welder varies as shown in FIG. 4(a) as described above, the welding current Ia varies as shown in FIG. 4(b) at a delay from the voltage due to the d.c. reactor 8 Therefore, the rising period of the welding current Ia corresponds to the shorting period and the dropping period corresponds to the arcing period. Since the input of the differentiation circuit 36 also assumes similar variation, its output Δi has a waveform as shown in FIG. 4(c) and its positive and negative output levels correspond to the shorting and arcing periods, respectively. Accordingly, if the Zener voltage of the Zener diode 43 of the gating signal generator 39 is preset at a little positive value, the Zener diode 43 is put in conduction during the shorting period by the output voltage of the amplifier 41 through the base-emitter path of the transistor 44 to produce a gating signal Gi as shown in FIG. 4(d) through the diode 40. The gating signal Gi energizes the relay 28 to effect decremental correction of the output voltage as same as the above-mentioned voltage-dependent gating signal Gv.

Figure 4:
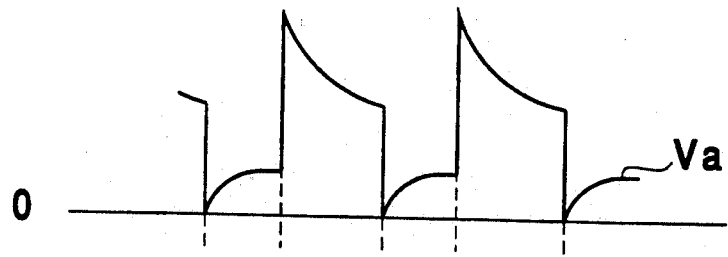
FIGS. 4(a) to (f) are waveform diagrams for explaining operation of the above embodiment of this invention.
Figure 4:
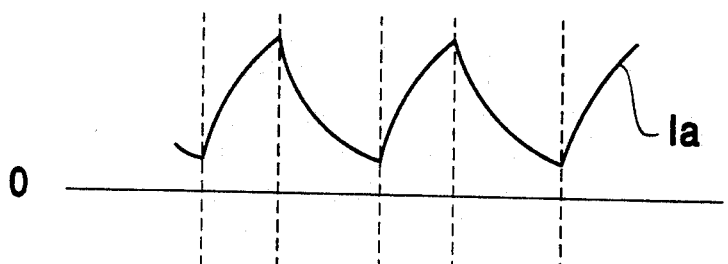
Figure 4:
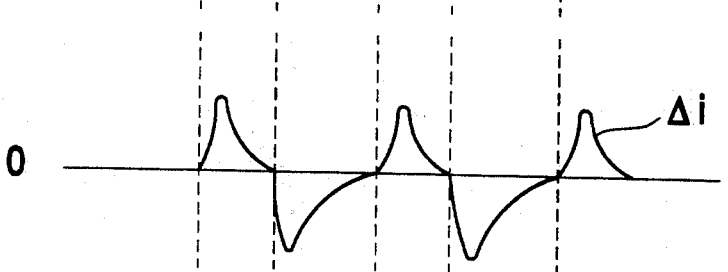
Figure 4:
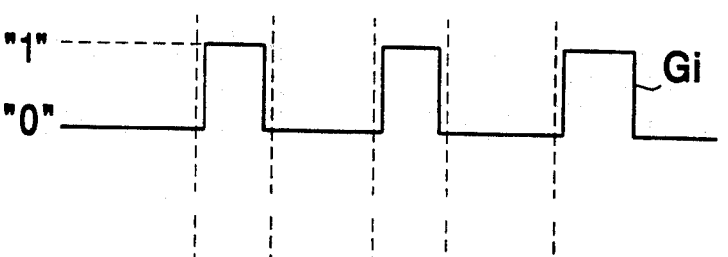
Figure 4:
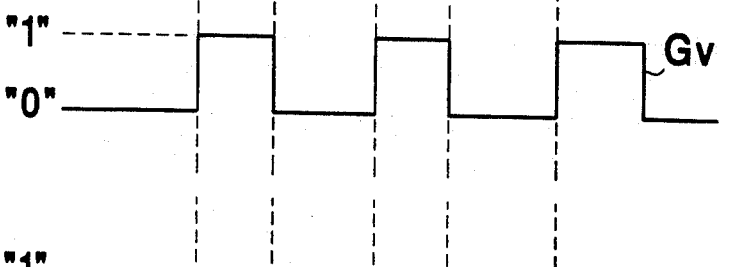
Figure 4:
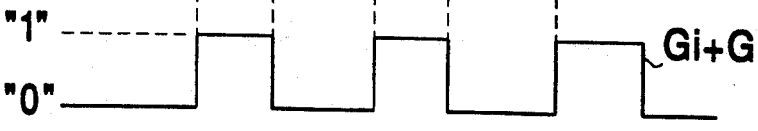

Although the gating signal Gi is not affected by the high frequency ripple noise of the output signal Va since it is based upon the differentiated value i of the welding current Ia its high level period is a little narrower than the shorting period, as shown in FIG. 4(d), due to nonzero value of the Zener voltage of the Zener diode 43. However, by using it together with the above-mentioned voltage-dependent gating signal Gv, the gating signal Gi+Gv applied to the relay 28 becomes as shown in FIG. 4(f) and the above-mentioned problem is deleted. If this problem is allowed as insignificant, however, the circuit 22 for producing the gating signal Gv can be omitted, thereby simplifying the device.

The embodiment as described above has been given only for the purpose of illustration of the invention and does not mean any limitation thereof. It should be obvious to those skilled in the art that various modifications and changes can be made on this embodiment without leaving the spirit and scope of the invention as defined in the apended claims.

We claim:

1. A consumable electrode d.c. arc welder comprising an input rectifier for rectifying an a.c. supply power, an inverter for converting an output of said input rectifier into a high frequency a.c. power, an output rectifier for rectifying an output of said inverter, means for supplying an output of said output rectifier to a welding load, and feedback control means for detecting an output voltage of said output rectifier and driving said invertor based upon a difference between said voltage and a predetermined reference voltage; wherein said welder further comprises:

means for detecting a current flowing through said welding load and generating a detection signal corresponding thereto, a differentiation circuit means for differentiating said detection signal, means for producing a first gating signal when an output level of said differentiation circuit means is positive, and correcting means responsive to said first gating signal for reducing said reference voltage by a predetermined value.

2. An arc welder as set forth in claim 1, wherein said welder further comprises:

means for producing a second gating signal when said output voltage of said output rectifier is below a predetermined level, and means for supplying said second gating signal to said correcting means in order to reduce said reference voltage by said predetermined value in response to a logic sum of said first and second gating signals.

* * * * *